United States Patent [19]

Tanaka et al.

[11] Patent Number: 4,912,650
[45] Date of Patent: Mar. 27, 1990

[54] OFF-LINE CONTROL EXECUTION METHOD

[75] Inventors: Kunio Tanaka; Haruhiko Tatsumi; Yoshiharu Nagatsuka, all of Tokyo, Japan

[73] Assignee: Fanuc Ltd., Minamitsuru, Japan

[21] Appl. No.: 186,490

[22] PCT Filed: Jul. 7, 1987

[86] PCT No.: PCT/JP87/00478
§ 371 Date: Mar. 7, 1988
§ 102(e) Date: Mar. 7, 1988

[87] PCT Pub. No.: WO88/00729
PCT Pub. Date: Jan. 28, 1988

[30] Foreign Application Priority Data

Jul. 10, 1986 [JP] Japan .................................. 61-162428

[51] Int. Cl.⁴ ........................ G06F 15/46; G05B 19/42
[52] U.S. Cl. ............................... 364/513; 318/568.13; 364/191; 364/189; 901/3
[58] Field of Search ..................... 364/513, 191–193, 364/188, 189, 474.22–474.27; 318/568, 568.11, 568.13, 568.14; 901/2–6; 414/730

[56] References Cited

U.S. PATENT DOCUMENTS

| | | | |
|---|---|---|---|
| 4,328,550 | 5/1982 | Weber | 364/192 X |
| 4,379,335 | 4/1983 | Kirsch et al. | 364/193 X |
| 4,484,294 | 11/1984 | Noss | 364/193 X |
| 4,595,989 | 6/1986 | Yasukawa et al. | 364/193 X |
| 4,757,459 | 7/1988 | Lauchnor et al. | 364/193 X |

*Primary Examiner*—Joseph Ruggiero
*Attorney, Agent, or Firm*—Staas & Halsey

[57] ABSTRACT

A correlation between numbers of input/output ports in a robot controller and F keys (F0–F15) provided on the off-line programming apparatus is preset and stored in a storage area (1c-2). In this state, off-line control is executed based on robot data stored in a storage area (1c-1). If input of a prescribed signal is being awaited, an F key corresponding to the port through which this signal is inputted is pressed to generate this signal artificially. As a result, since the conditions for executing the next command are satisfied, the next command is executed. If output of a prescribed signal is being awaited, an F key corresponding to the port through which this signal is outputted is pressed to generate this signal artificially. As a result, since the conditions for executing the next command are satisfied, the next command is executed.

4 Claims, 5 Drawing Sheets

| NO. | F KEY | PORT NO. | MEANING |
|---|---|---|---|
| 1 | F0 | RDO 1 | SEALANT VALVE OPEN/CLOSED |
| 2 | F1 | RDO 2 | CLEANING AGENT VALVE OPEN/CLOSED |
| 3 | F2 | RDO 3 | AIR VALVE OPEN/CLOSED |
| 4 | F3 | SDO 1 | CONVEOYOR OPERATION INSTRUCTION |
| 5 | F4 | SDI 1 | WORKPIECE SIGNAL DETECTION |
| ⋮ | ⋮ | ⋮ | ⋮ |

OFF-LINE CONTROL EXECUTION METHOD

TECHNICAL FIELD

This invention relates to an off-line control execution method for executing robot control off-line on the basis of robot data created by an off-line programming apparatus. More particularly, the invention relates to an off-line control execution method which takes into account the on/off state of input/output signals exchanged by a robot controller and the robot.

BACKGROUND ART

When parts at a work station are to be handled by a robot, it is necessary to create robot data which include path data indicating what path the robot is to be moved along and up to what point, as well as data specifying the robot motions, and to input these data to the robot controller. The tendency recently is to create and input such robot data by an off-line programming operation without relying upon a teaching operation.

This off-line programming is carried out by defining robot motion in a simple robot language, translating a source program created in the robot language by the translating function of an off-line programming apparatus and adopting the translated program as robot data of predetermined codes executable by the robot controller.

When the robot data are inputted to the robot controller and the controller is started, the desired robot motions are executed.

FIG. 5 is a block diagram of such a robot controller. The robot controller 11 has the constitution of a computer and includes a processor 11a, a control program memory (ROM) 11b, a RAM 11c for storing robot data as well as the results of processing and the like, a control panel 11d, an axis controller 11e constituted by a pulse distributor and servocircuitry, and an input/output port 11f for performing input/output of digital signals with a robot side 12.

The processor 11a executes commands contained in the robot data one at a time. If the data are path data, the processor 11a causes the axis controller 11e to perform path processing to move the robot. If a command is one for output of a digital signal, then the processor outputs the digital signal to the robot side via a predetermined port 11f-i (i = 1, 2, . . .) of the input/output port 11f and receives a predetermined digital signal from the robot side via a predetermined input/output port and executes predetermined processing.

The off-line programming apparatus is equipped with a function (referred to as an 'interpreter' function) through which the robot data that have been created are executed off-line, namely without the robot being connected. In accordance with the interpreter function, the robot data can be executed one command at a time and, as shown in FIG. 6, a robot path RP, the line number LN of the present block and the end point coordinates PND of the present block are painted on a display screen, thus allowing robot motions to be verified.

In actual control based on robot data, there are cases where a subsequent command can be executed only after a predetermined signal from the robot side has entered the robot controller via the predetermined input/output port. For example, when the robot controller commands the robot side to start a conveyor operation, there are cases where the next command can be executed by the robot controller after it receives a signal from the robot side to the effect that the conveyor has started.

In conventional off-line control, the abovementioned signal cannot be generated. With conventional off-line control, therefore, it is arranged so that the controller may proceed to the next command even without receiving the aforementioned signal. However, though it is possible to verify motion relating to robot movement by looking at the display screen in accordance with the conventional method, a problem is that verification of robot motions based on digital signals exchanged with the robot side cannot be carried out.

Furthermore, it is not possible with the conventional method to verify the output of digital signals to the robot side.

SUMMARY OF THE INVENTION

Accordingly, an object of the present invention is to provide an off-line control execution method through which it is possible to verify operations based on digital signals exchanged with the robot side.

This invention relates to an off-line control execution method for executing robot control off-line on the basis of robot data created by an off-line programming apparatus. In the off-line control execution method, a correlation between numbers of input/output ports in a robot controller and function keys provided on the off-line programming apparatus is stored in advance. In off-line control, predetermined input/output signals are generated by operating function keys corresponding to the ports through which these input/output signals pass.

DESCRIPTION OF THE PREFERRED EMBODIMENT

Figure 1:
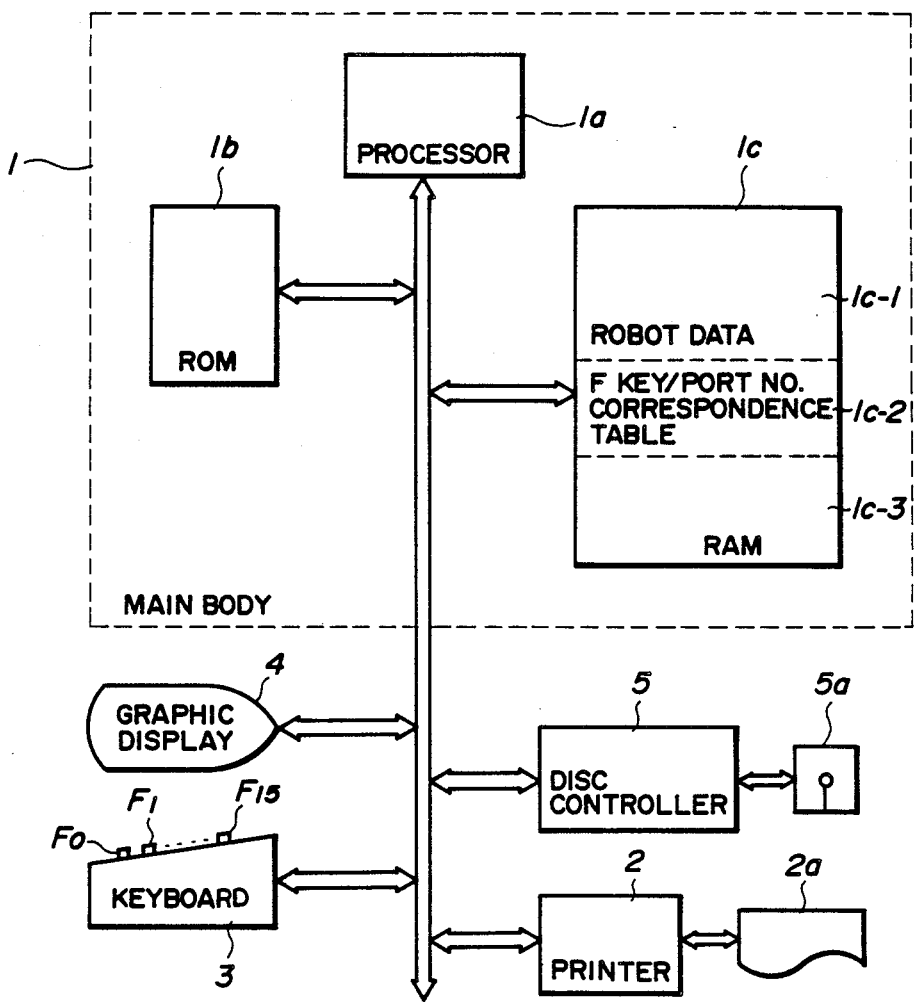
FIG. 1 is a block diagram of an off-line programming apparatus for practicing the method of the present invention.
Figures 2, 3:
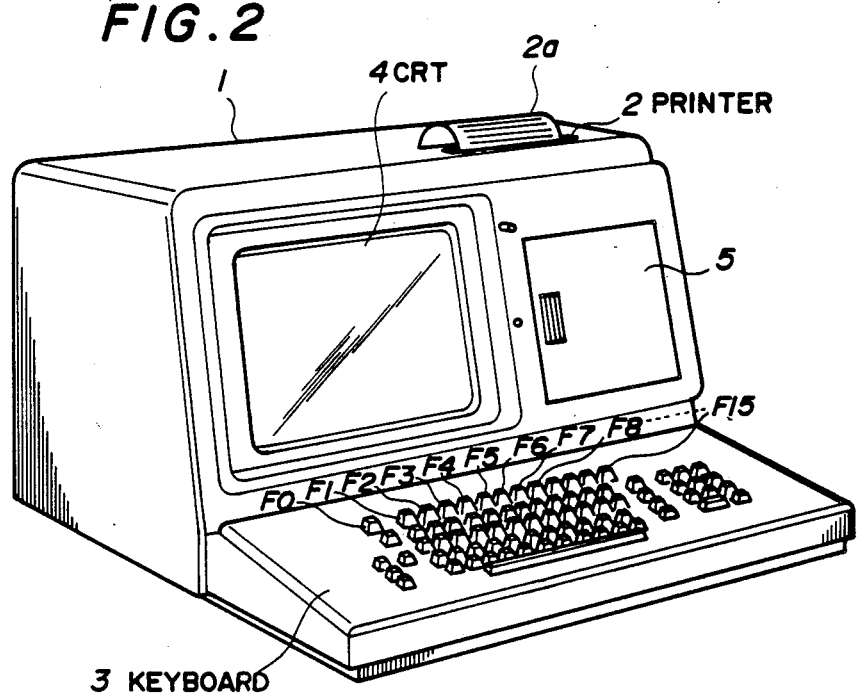
FIG. 2 is an external view of the off-line programming apparatus.
FIG. 3 is an example of an F key/port number correspondence table.

FIG. 1 is a block diagram of an off-line programming apparatus for practicing the method of the present invention, and FIG. 2 is an external view of the off-line programming apparatus.

Numeral 1 denotes the main body of an off-line programming apparatus having a processor 1a, a ROM 1b and a RAM 1c. Numeral 2 denotes a printer, 3 a keyboard, 4 a graphic display unit (CRT), and 5 a disc controller.

The keyboard 3 is provided with lockable function keys (referred to as 'F keys') F0 through F15 each equipped with a lamp. The F keys are locked the first time they are pressed and are unlocked by pressing them a second time. The lamps light when the keys are pressed.

The RAM 1c has a storage area 1c-1 for storing created robot data, a storage area 1c-2 for storing an F key/port number correspondence table, and a storage area 1c-3 for storing other data.

The F key/port number correspondence table provides the correlation between the port numbers of the robot controller input/output ports and the F keys (F0–F15). For example, the correspondence will be of the kind shown in FIG. 3 in the case of a sealing operation.

(i) The F key (F0) corresponds to an input/output port number RDO1. When the F0 key is in the depressed state, this corresponds to opening of a sealant valve (valve ON); when the F0 key is in the released state, this corresponds to closing of the sealant valve (valve OFF).

(ii) The F key (F1) corresponds to an input/output port number RDO2. When the F1 key is in the depressed state, this corresponds to opening of a cleaning agent valve (valve ON); when the F1 key is in the released state, this corresponds to closing of the cleaning agent valve (valve OFF).

(iii) The F key (F2) corresponds to an input/output port number RDO3. When the F2 key is in the depressed state, this corresponds to opening of an air valve (valve ON); when the F2 key is in the released state, this corresponds to closing of the air valve (valve OFF).

(iv) The F key (F3) corresponds to an input/output port number SDO1. When the F3 key is in the depressed state, this corresponds to start of a conveyor operation; when the F3 key is in the released state, this corresponds to termination of the conveyor operation.

(v) The F key (F4) corresponds to an input/output port number SDI1. When the F4 key is in the depressed state, this corresponds to workpiece detection; when the F4 key is in the released state, this corresponds to non-detection of a workpiece.

Figure 4:
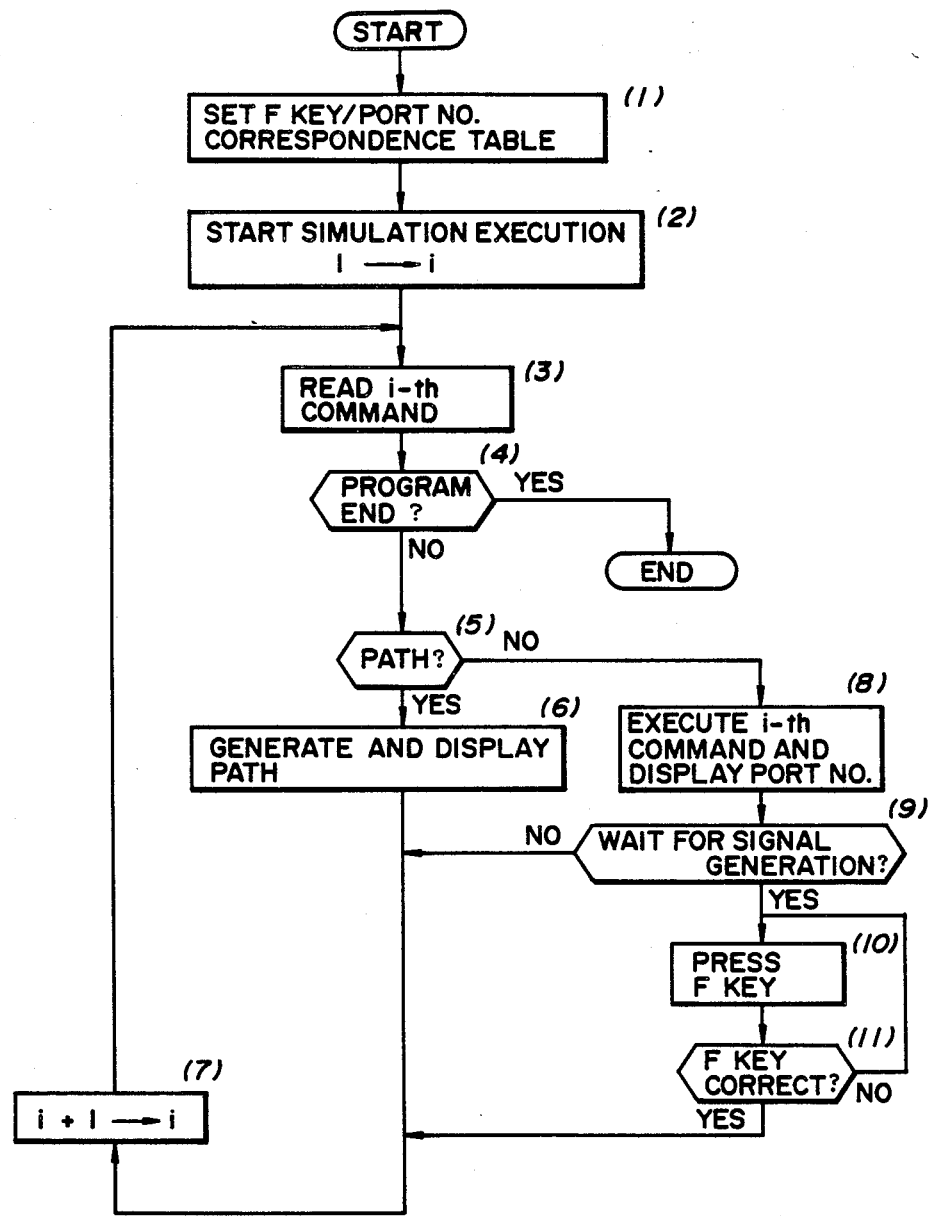
FIG. 4 is a flowchart of processing according to the present invention.
Figure 5:
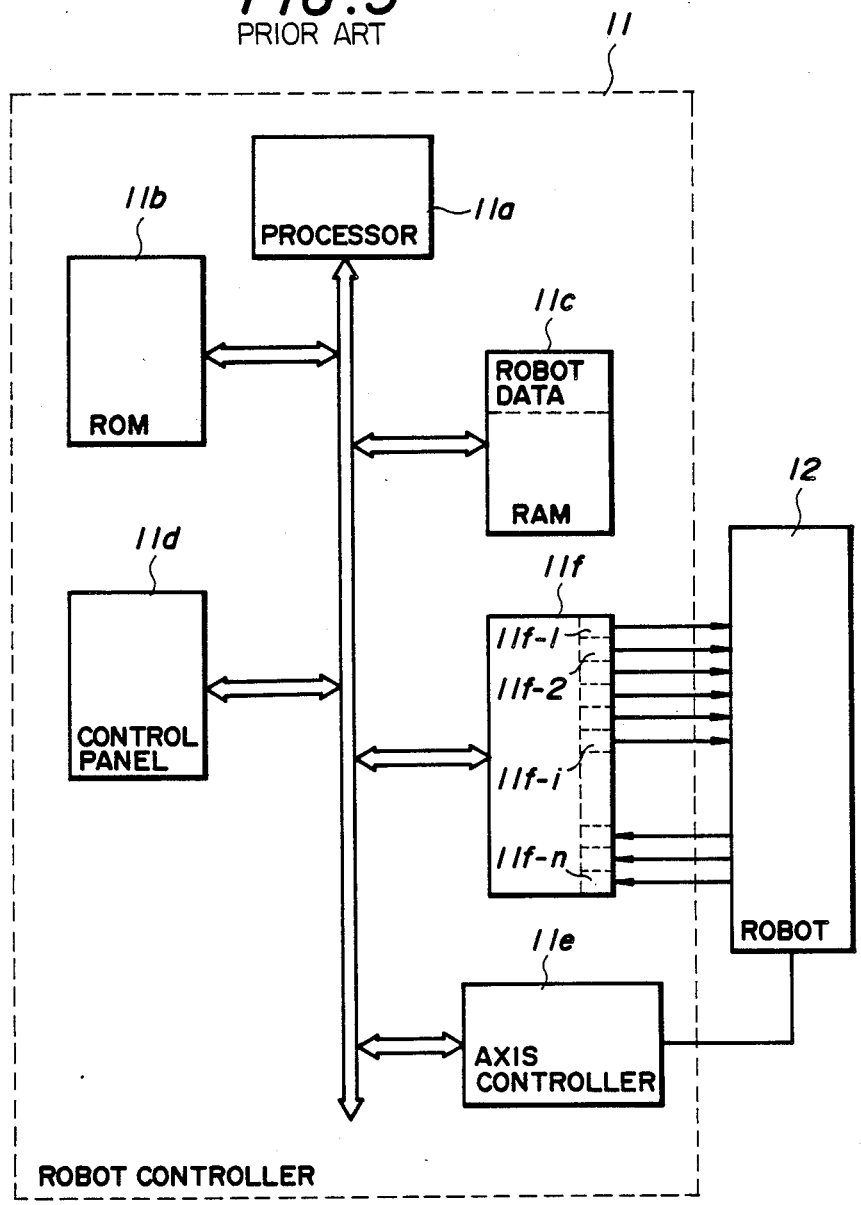
FIG. 5 is a block diagram of a robot controller.

FIG. 4 is a flowchart of off-line control execution according to the present invention. Processing of the invention will now be described in accordance with FIGS. 1 through 4. It will be assumed that robot data have already been stored in the storage area 1c-1 of RAM 1c by an off-line programming operation.

(1) Off-line control execution processing is selected when a prompt for process selection is displayed on the graphic display unit 4. In response to selection of off-line control execution processing, a display for setting a correspondence table between the F keys and the port numbers appears on the display screen, by way of example. Therefore, the abovementioned correspondence table is set anew or a correspondence table that has already been created is revised. A set correspondence table is stored in the storage area 1c-2.

(2) When the setting of the correspondence table ends, on-line control (simulation) execution is designated by a key operation or the like. In response, the processor performs the operation 1 →i.

(3) Next, the processor reads an i-th command.

(4) Thereafter, the processor checks whether the i-th command is a command indicative of program end; if it is, processing is terminated.

(5) If it is not the end of the program, the processor determines whether the command is a command for path control.

Figure 6:
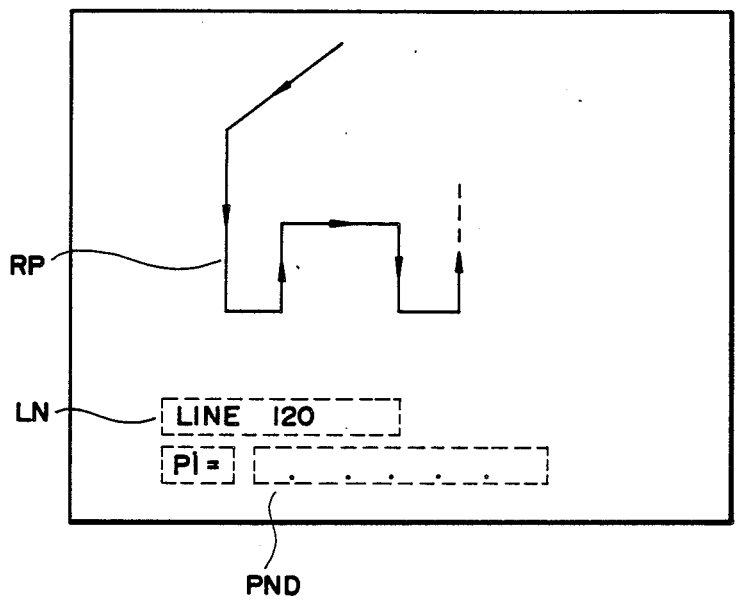
FIG. 6 is an example of a display for describing conventional off-line control.

(6) If the command is for path control, then the line number LN of the command and the position data PND are displayed and the path trajectory RP is generated to display the path on the display screen as in the prior art (see FIG. 6).

(7) Thereafter, the processor updates i by the operation i +1 →i and executes processing from step (3) onward.

(8) If the command is found not to be path control data at step (5), then the command is executed.

If a command is for outputting a digital signal to the robot side from a predetermined port, the number of the port (or the corresponding F key number) which outputs the digital signal is displayed on the display screen and the generation of the digital signal is awaited (wait for output).

If the command indicates that generation of a digital signal inputted via a predetermined port is to be awaited (wait for input), then the number of the port (or the F key number) through which the digital signal is inputted is displayed on the display screen and the generation of this digital signal is awaited.

(9) The processor waits for a prescribed F key to be pressed if the state prevailing is that in which the generation of the digital signal is being awaited. If generation of the digital signal is not being awaited, then i is updated by step (7) and processing from step (3) onward is repeated.

(10) A prescribed F key is pressed in the state in which the generation of the digital signal is being awaited.

(11) When the F key has been pressed, the processor checks whether this F key is the correct F key conforming to the port number being displayed. If it is the correct key, i is updated at step (7) and processing from step (3) onward is repeated. If it is the wrong key, the processor waits for the correct F key to be pressed.

In accordance with the present invention, a correlation between numbers of input/output ports in a robot controller and function keys provided on an off-line programming apparatus is stored in advance. In off-line control, input/output of predetermined signals relative to an external unit is performed by operating function keys corresponding to the ports through which these signals are inputted and outputted. As a result, it is possible to carry out simulation of motions based on digital signals exchanged with the robot side.

We claim:
1. An off-line control execution method for executing robot control off-line on the basis of robot data created by an off-line programming apparatus, comprising the steps of
   storing a correlation between numbers of input/output ports in a robot controller, which actually controls a robot on the basis of said robot data, and function keys provided on the off line programming apparatus, and
   generating predetermined input/output signals in off-line control by operating function keys corresponding to the ports through which said input-/output signals pass.

2. An off-line control execution method according to claim 1, characterized in that said function keys lock in a depressed state and are equipped with lamps.

3. An off-line control execution method according to claim 1, further comprising the steps of:
   when input of a prescribed signal is being awaited in off-line control, a number of a port through which said signal is inputted or a function key number is displayed, and
   the next item of robot data is executed by pressing a function key conforming to said port number or said function key number.

4. An off-line control, execution method according to claim 1, further comprising the steps of: when output of a prescribed signal is being awaited in off-line control, a number of a port through which said signal is outputted or a functin key number is displayed, and
   the next item of robot data is executed by pressing a function key conforming to said port number or said function key number.

* * * * *